US011486542B2

(12) United States Patent
Saeedi

(10) Patent No.: US 11,486,542 B2
(45) Date of Patent: Nov. 1, 2022

(54) SYSTEM AND METHOD OF STORING AND RECOVERING ENERGY BY MEANS OF COMPRESSED GAS, COMPRISING A MIXED LAYER OF PRESTRESSED CONCRETE

(71) Applicant: IFP Energies nouvelles, Rueil-Malmaison (FR)

(72) Inventor: Navid Saeedi, Alfortville (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 718 days.

(21) Appl. No.: 16/332,461

(22) PCT Filed: Sep. 1, 2017

(86) PCT No.: PCT/EP2017/071959
§ 371 (c)(1),
(2) Date: Mar. 12, 2019

(87) PCT Pub. No.: WO2018/050455
PCT Pub. Date: Mar. 22, 2018

(65) Prior Publication Data
US 2021/0278044 A1    Sep. 9, 2021

(30) Foreign Application Priority Data

Sep. 13, 2016  (FR) .................................... 16/58.503

(51) Int. Cl.
*F17C 1/06*   (2006.01)
*F17C 5/06*   (2006.01)

(52) U.S. Cl.
CPC .................. *F17C 1/06* (2013.01); *F17C 5/06* (2013.01); *F17C 2201/0104* (2013.01);
(Continued)

(58) Field of Classification Search
CPC ...... F17C 1/06; F17C 5/06; F17C 2201/0104; F17C 2203/0621; F17C 2203/0624;
(Continued)

(56) References Cited

U.S. PATENT DOCUMENTS 2,031,057 A * 2/1936 Mitchell .................. E03F 3/04
                                                       138/145
3,217,451 A * 11/1965 Closner .................. E04G 21/12
                                                       52/223.3
(Continued)

FOREIGN PATENT DOCUMENTS

CN     85105541 A1    9/1986
CN     101749490 A    6/2010
(Continued)

OTHER PUBLICATIONS

International Search Report for PCT/EP2017/071959, dated Nov. 10, 2017; English translation submitted herewith (7 pgs.).

*Primary Examiner* — Shawn M Braden
(74) *Attorney, Agent, or Firm* — Fitch, Even, Tabin & Flannery LLP

(57) ABSTRACT

The invention is a reservoir for the storage of a pressurized fluid such as compressed air notably to the storage and recovery of energy using compressed air. In particular, the reservoir comprises at least one tube formed of an arrangement of concentric layers (C1, C2, C3, C4). This arrangement comprises, working from the inside toward the outside of the tube, an internal layer (C1) formed of concrete, a layer (C2) formed of steel of thickness E, at least one layer (C3) formed by a winding of steel wires (C3") on a sublayer (C3') of concrete, and an external layer (C4) which protects the wires against at least one of physical and chemical damage, and in which the wires are subjected to circumferential (hoop) tensile prestress with at least one of the thickness E
(Continued)

and the prestress being rated to withstand the pressure of pressurized fluid.

17 Claims, 2 Drawing Sheets

(52) U.S. Cl.
CPC .............. *F17C 2203/0621* (2013.01); *F17C 2203/0624* (2013.01); *F17C 2203/0639* (2013.01); *F17C 2203/0678* (2013.01); *F17C 2209/2145* (2013.01); *F17C 2209/2154* (2013.01); *F17C 2227/0365* (2013.01); *F17C 2260/046* (2013.01)

(58) Field of Classification Search
CPC ...... F17C 2203/0639; F17C 2203/0678; F17C 2209/2145; F17C 2209/2154; F17C 2227/0365; F17C 2260/046; F02C 6/16; F02C 7/10
See application file for complete search history.

(56) References Cited

U.S. PATENT DOCUMENTS

| | | | | |
|---|---|---|---|---|
| 3,340,115 | A | * | 9/1967 | Rubenstein ............ B29C 70/865 156/86 |
| 3,489,626 | A | * | 1/1970 | Rubenstein ............ B28B 23/046 156/86 |
| 4,271,647 | A | | 6/1981 | Balck, Jr. |
| 2011/0100583 | A1 | * | 5/2011 | Freund ................... F28D 17/02 165/10 |
| 2015/0014186 | A1 | | 1/2015 | Wang et al. |
| 2017/0138674 | A1 | * | 5/2017 | Pourima ................. F28D 20/00 |

FOREIGN PATENT DOCUMENTS

| | | |
|---|---|---|
| DE | 102011086894 A1 | 5/2013 |
| WO | 2004/001280 A1 | 12/2003 |
| WO | 2006/046872 A1 | 5/2006 |
| WO | 2015/150104 A1 | 10/2015 |

\* cited by examiner

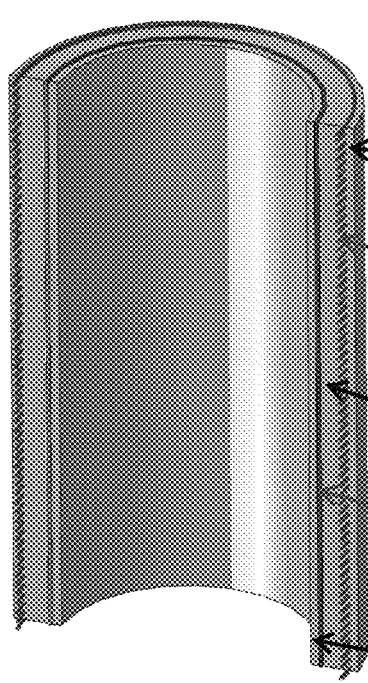
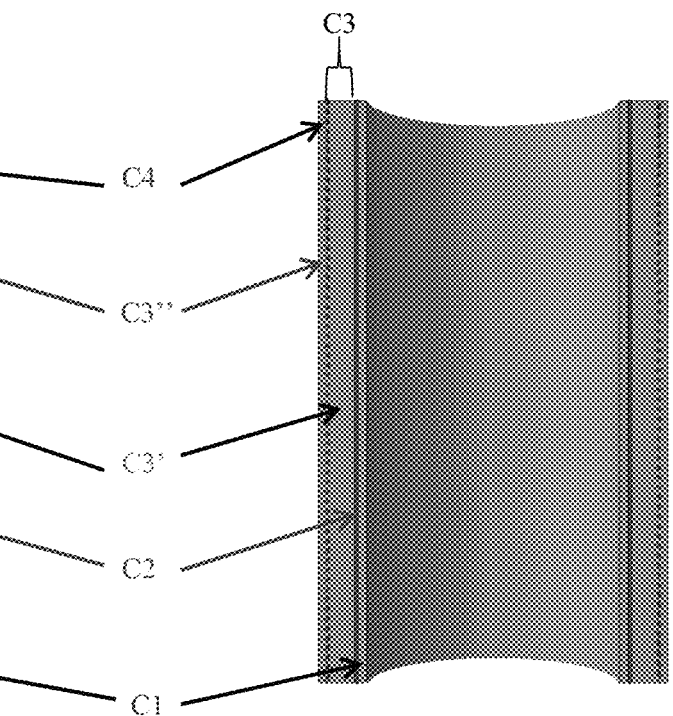
Fig. 1a  Fig. 1b
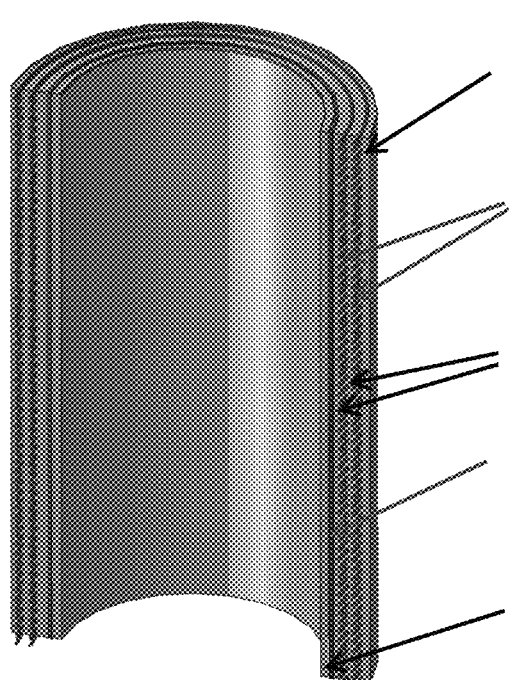
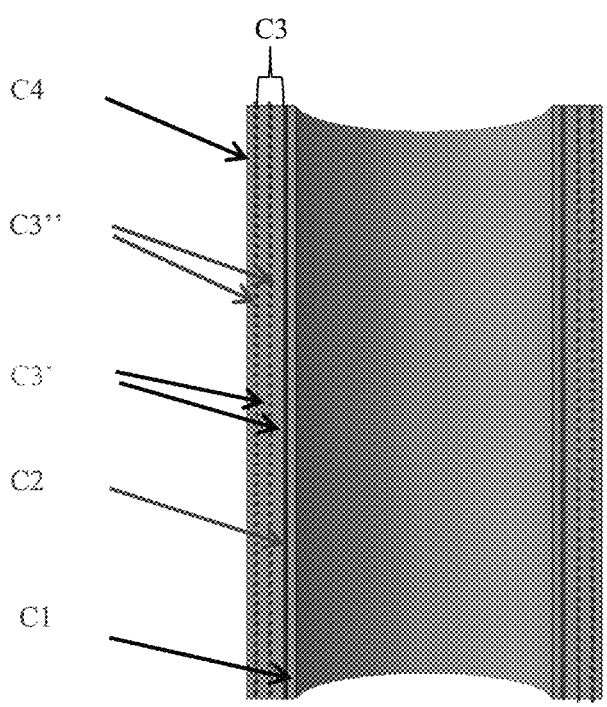
Fig. 2a  Fig. 2b

SYSTEM AND METHOD OF STORING AND RECOVERING ENERGY BY MEANS OF COMPRESSED GAS, COMPRISING A MIXED LAYER OF PRESTRESSED CONCRETE

CROSS REFERENCE TO RELATED APPLICATIONS

Reference is made to PCT/EP2017/071959 filed Sep. 1, 2017, and French Application No. 16/58.503 filed Sep. 13, 2016, which are incorporated herein by reference in their entirety.

BACKGROUND OF THE INVENTION

Field of the Invention

The present invention relates to the storage of a pressurized fluid such as compressed air. In particular, the present invention relates to the storage and restitution of energy using compressed gas such as air.

Description of the Prior Art

A compressed-air storage system (also referred to as ACAES, which stands for "Adiabatic Compressed Air Energy Storage") stores energy in the form of compressed air, for subsequent use. For storage, energy, notably electrical energy, drives air compressors and, for recovery, the compressed air drives turbines, which may be connected to an electrical generator.

There are variations of compressed-air energy storage systems, aimed notably at improving the efficiency of such systems. Of particular mention are of the following systems and methods:
  ACAES (which stands for "Adiabatic Compressed Air Energy Storage") in which the air is stored at the temperature caused by the compression.
  AACAES (which stands for "Advanced Adiabatic Compressed Air Energy Storage") in which the air is stored at ambient temperature, and the heat caused by the compression is also stored, separately, in a Thermal Energy Storage (TES) system. In this case, the heat stored in the TES is used to warm the air before it is expanded.

In all instances, whether the air is stored at ambient temperature or at any other temperature, such a compressed air energy storage system requires a compressed-air storage reservoir which is both resistant to the storage pressure and impervious to the gas stored. Pressure resistance is notably a significant concern because the compressed-air storage pressures are at least equal to 100 bar.

Storing compressed gas in all-steel reservoirs is a conventional solution. This is because steel has both fluidtightness and pressure-resistance properties. However, while fluidtightness is provided upwards of relatively small (a few mm) thicknesses of steel, it is necessary to employ far greater thicknesses of steel when a fluid is to be stored at high pressure (which means to say at a pressure in excess of 100 bar, and preferably of the order of 125 bar). For example, a cylindrical reservoir with a diameter of 56" (1422.4 mm) needs to have a minimum wall thickness of 33.5 mm in order to withstand an internal pressure of 125 bar (calculated according to the CODAP standard for a steel grade X80).

While an all-steel reservoir is a technically and economically advantageous solution for small volumes of gas to be stored at high pressure, an all-steel reservoir is not possible in the case of large volumes of gas to be stored at high pressure. This is because not only does the cost of the steel compromise the economic viability of the system but also the design of such a reservoir gives rise to manufacturing constraints which are difficult to meet. Specifically, the greater the diameter of the spherical or cylindrical storage reservoir, the greater the wall thickness needed in order to withstand the pressure. For large storage volumes, manufacturing, and especially welding, an element with a very large thickness is not always achievable. In this case, a large volume is stored by assembling several smaller sized elements, coupled together. As they have smaller dimensions, these elements are technically manufacturable and thus the manufacturing constraints are overcome. By contrast, the economic viability of the system may be jeopardized because of the quantity of steel needed and the costs of assembly.

SUMMARY OF THE INVENTION

In order to alleviate these disadvantages, the present invention relates to a reservoir for storing a pressurized fluid such as compressed air, designed in the form of a tube formed by an alternation of layers of concrete and of steel with prestressing wires. First of all, storage in tubes makes it possible to avoid the manufacturing problems explained hereinabove. Secondly, the mixed design using steel, concrete and prestressing wires allows the mechanical capabilities of each material to be used to their best potential, thereby reducing the cost of the system.

The storage reservoir according to the invention comprises, working from the inside toward the outside of the reservoir, a first arrangement formed of a solid steel layer between two layers of concrete, with this arrangement being followed by at least one winding of steel wires subjected to a circumferential prestress in the system, which is intended to compensate for some of the radial pressure applied by the stored fluid. A final protective layer may be of concrete, which protects the reservoir and notably the wound steel wires. Winding steel wires under tension makes it possible to reduce the stresses in service and therefore to reduce the thickness of steel needed for the solid-steel layer. The invention also relates to a method for manufacturing such a reservoir for storing a pressurized fluid.

Furthermore, the invention relates to a storage and recovery system and method using compressed gas implementing a pressurized-fluid storage reservoir according to the invention.

In general, the subject matter of the invention relates to a reservoir for the storage of a pressurized fluid such as compressed air. In particular, the reservoir comprises at least one tube formed with an arrangement of concentric layers, the arrangement comprising, working from the inside toward the outside of the tube, an internal layer formed of concrete, a layer formed of steel of thickness E, at least one layer formed by a winding of steel wires on a sublayer of concrete, and an external layer intended to protect the wires against at least one of physical and chemical damage, and in which the wires are subjected to circumferential tensile prestress, at least one of the thickness E and the prestress being rated to withstand the pressure.

According to one embodiment of the invention, the diameter and spacing of the steel wires in an axial direction of the tube may be dependent on the prestress.

Advantageously, the tube may comprise layers formed by the winding of steel wires on the concrete sublayer, and in which the prestressing of the windings may be determined according to the radial distance of the layers.

According to one embodiment of the invention, the external layer may be made of concrete or mortar.

For preference, the layer made of steel may correspond to a steel tube of API grade X80.

According to one embodiment of the invention, the reservoir may be formed of the tubes that are not coupled together.

Advantageously, the reservoir may be formed of tubes, with the tubes being coupled together by welding or using an elastomer seal.

The invention also relates to a method for manufacturing a reservoir for storing a pressurized fluid as described hereinabove, characterized in that, starting from a solid-steel tube of thickness E and a reel of steel wire, at least the following steps are performed:
 a) forming a concrete layer on the inside of the steel tube;
 b) forming a concrete sublayer on the outside of the steel tube;
 c) winding the steel wires from a reel helicoidally while subjecting them to circumferential (hoop) tensile prestress; and
 d) providing an external layer for protecting the steel wires against at least one physical and chemical damage; wherein at least one of the thickness E and the prestress are dependent on the pressure.

According to one implementation of the manufacturing method according to the invention, steps b) and c) described hereinabove can be repeated to form the winding of steel wires on a concrete sublayer.

According to one embodiment of the manufacturing method according to the invention, at least the internal concrete layer and the concrete sublayer may be formed by centrifugal spinning or alternatively by vibration molding.

The invention also relates to a system for storing and recovering energy by use of compressed gas comprising at least one means for compressing the gas, at least one reservoir for storing a pressurized fluid as described hereinabove, at least one means for expanding the compressed gas to generate energy, and at least one means for storing heat.

The invention also relates to a method for storing and recovering energy by use of compressed gas, in which method the following steps are performed:
 compressing a gas;
 cooling the compressed gas by exchange of heat in a heat storage;
 storing the cooled gas in a reservoir for storing a pressurized fluid as described hereinabove;
 warming the cooled compressed gas by restitution of the heat stored in the heat storage; and
 expanding the warmed compressed gas to generate energy.

Other features and advantages of the method according to the invention will become apparent upon reading the following description of nonlimiting exemplary embodiments with reference to the appended figures described hereinbelow.

BRIEF DESCRIPTION OF THE DRAWINGS

FIGS. 1a and 1b depict vertical sections, in an isometric three-dimensional elevation in FIG. 1a and in an on face view in FIG. 1b, taken through an exemplary embodiment of the reservoir according to the invention, comprising a single mixed layer of prestressed concrete.

FIGS. 2a and 2b depict vertical sections, in an isometric three-dimensional elevation in FIG. 2a and in a front view in FIG. 2b, taken through an exemplary embodiment of the reservoir according to the invention, comprising two mixed layers of prestressed concrete-steel.

DETAILED DESCRIPTION OF THE INVENTION

Figure 3:
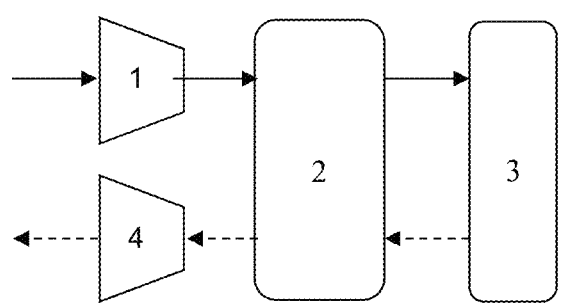
FIG. 3 depicts one exemplary embodiment of a storage and recovery system using compressed gas according to the invention implementing a pressurized-fluid storage reservoir according to the invention.

The present invention relates to a reservoir for the storage of a pressurized fluid such as compressed air. Such a reservoir may notably be employed in a system for storing and recovering energy by using compressed gas. In general, the "service pressure" is the pressure at which the fluid is intended to be stored. Typically, in a compressed-gas energy storage and recovery application, the service pressure is in excess of 100 bar, and generally of the order of 125 bar.

The reservoir for storing a pressurized fluid according to the invention comprises at least one tube formed as an arrangement of concentric layers. According to the invention, the tube may be of cylindrical shape of circular cross section or a polygonal, such as octagonal, cross section.

According to the invention, the concentric layers of the tube forming the reservoir for storing the pressurized fluid are ordered, working from the inside toward the outside of the tube, as follows:
 an internal layer made of concrete;
 a layer made of steel of thickness E;
 at least one layer formed of a winding of steel wires on a concrete sublayer, the steel wires being subjected to a circumferential tensile prestress; and
 an external layer for protecting the steel wires against at least one of physical and chemical damage.

According to the invention, the steel layer of thickness E has multiple roles: First, making the reservoir according to the invention fluidtight, contributing to the mechanical strength that allows the assembly to withstand the service pressure (at least in excess of 100 bar and preferably of the order of 125 bar), and second also increasing the ductility of the overall assembly. In order to meet the technical constraints thus listed, and notably contribution to the mechanical strength of the reservoir that allows it to withstand the service pressure, the thickness E of the steel layer of one alternative form of the reservoir is at least 8 mm, preferably at least 10 mm. According to one implementation of the invention, the steel layer of the reservoir according to the invention corresponds to an existing steel pipe, such as, for example, a pipe intended for transporting hydrocarbons over long distances, also referred to as an oil pipeline. Specifically, oil pipelines are characterized by excellent fluidtightness (numerous ultrasound, x-ray and/or hydraulic inspections), significant thicknesses of steel (up to several centimeters) and relatively large diameters (up to 60 inches). According to one implementation of the invention, use is made of a steel tube of API grade X80.

According to the invention, the layer formed by a winding of steel wires subjected to a circumferential prestress over a concrete sublayer, referred to hereinafter as a "mixed layer of prestressed concrete", has the role of reducing the circumferential stress borne by the steel layer when the reservoir according to the invention enters service. The application of a circumferential tensile prestress therefore makes possible engineering a pressurized-fluid storage reservoir with a thickness E of steel lower than would be needed if no prestress were applied. Furthermore, this prestress subjects the layer(s) of concrete to compression which contributes to the strength of the assembly in the service phase. As a result, the reservoir according to the invention is more economical than an all-steel reservoir and, additionally, is technically achievable. According to one embodiment of the invention, the circumferential tensile prestress is obtained by winding steel wires under tension on the concrete sublayer.

According to the invention, the internal layer made of concrete is intended on the one hand to protect the internal face of the layer made of steel against at least one of physical and chemical damage (notably corrosion) and preventing this same layer from collapsing (because of the prestress applied to the steel wires) and in general withstand the stress induced by the pressurized fluid.

According to the invention, the concrete sublayer allows the layer made of steel to be separated from the steel wires themselves. This prestressed sublayer also contributes to the mechanical strength of the reservoir overall.

According to the invention, the external layer preserves the steel wires of the reservoir according to the invention from at least one of chemical attack (of the corrosion type) and physical attack. As a result, this external layer may be made of concrete, alternatively of mortar or any other material affording protection against at least one of chemical and physical attack.

According to the invention, at least the circumferential tensile prestress applied to the steel wires, or alternatively at least the thickness E of the layer made of steel, or alternatively at least both the circumferential tensile prestress applied to the steel wires and the thickness E of the layer made of steel are predetermined according at least to the service pressure. According to one embodiment of the invention, the service pressure is at least equal to 100 bar, preferably 125 bar. In general, the reservoir according to the invention is engineered in such a way that detrimental phenomena such as rupture, plastic deformation in the steel, macro cracking in the concrete, etc. are avoided when the reservoir according to the invention enters service. Advantageously, the thicknesses of the concrete sublayer and of the concrete internal layer are overengineered in order to withstand the compression applied by the prestressed wires and in order to contribute to the overall strength to withstand the service pressure. A designer is perfectly aware of how to engineer this, for example using Abaqus (Dassault Systems, France) software.

According to the invention, the reservoir according to the invention may be engineered as follows:

either the circumferential tensile prestress is predetermined: This may, for example, occur if, in order to manufacture the reservoir according to the invention, use is made of predefined steel wires having predetermined mechanical strength properties. In this case, the circumferential prestress is at most equal to the maximum tension that the steel wires in question can withstand, weighted by a factor of safety of between 0 and 1, preferably 0.75. In this case, the engineering of the reservoir according to the invention consists in at least determines the thickness E of the steel layer that will make it possible to comply with the condition of mechanical ability to withstand the service pressure, the circumferential tensile prestress being at least fixed elsewhere. In order to do this, according to one embodiment of the invention, the steel layer at least is engineered in such a way that the tensile stress in the steel layer in the service phase is as close as possible to the authorized limit for the steel used, without in any way exceeding this limit. The authorized limit is dependent on at least one of the elastic limit and on the ultimate tensile strength of the grade of steel used, weighted by factors of safety of between 0 and 1 (preferably 0.67 in the case of the elastic limit). For preference, the engineering of the steel layer also takes account of the fact that the compressive stress produced in the solid-steel layer in the phase of application of the prestress is as high as possible, so as to make maximum use of the tensile capabilities of the steel in the service phase. It is quite obvious that this prestress must not, however, exceed the stress allowed for that grade of steel. Advantageously, the thicknesses of the concrete sublayer and of the concrete internal layer are overengineered in order to withstand the compression applied by the prestressed wires and in order to contribute to the overall strength to withstand the service pressure. A designer is perfectly aware of how to engineer this, for example using Abaqus (Dassault Systems, France) software.

or the thickness E of the steel layer is already predetermined: This may, for example, occur because use is being made of an existing steel pipe of thickness E from which to manufacture the reservoir according to the invention. In this case, the engineering of the reservoir according to the invention consists in determining the circumferential tensile prestress that will make it possible to comply with the condition of mechanical ability to withstand the service pressure, for this thickness E of the steel layer. According to one embodiment of the invention, this engineering also takes account of the effects of applying the prestress in the concrete layers, so that this prestress is below the maximum compression strength that the concrete can withstand, weighted by a factor of safety of between 0 and 1, preferably 0.75. In addition, the thickness of concrete needs to be sufficient to withstand the compression in the service phase. In instances in which this thickness is relatively great, leaving aside the circumferential stress, the radial and axial stresses may be not insignificant. In such cases, and especially if tension in the concrete is allowed, non-linear 3-D behavioral models need to be employed for analysis and engineering. A specialist is perfectly aware of how to engineer this, for example using Abaqus (Dassault Systems, France) software.

or it is at least both the thickness E of the steel layer and the circumferential tensile prestress to be applied to the steel wires that is being engineered: In that case, there are a plurality of pairs (steel thickness E, circumferential tensile prestress) that will satisfy the condition of mechanical ability of the reservoir according to the invention to withstand the service pressure. In order to choose a given pair from among the plurality of possible pairs it is possible to add a selection criterion based on the overall cost of the reservoir and/or a criterion based on the technical feasibility, etc. According to one embodiment of the invention, the reservoir is engineered in such a way as to exploit the tensile strength of the steel wires to the full, and the purpose of this being to minimize the thickness E of the solid-steel layer. In order to generate a compression prestress that makes it possible to engineer a reservoir that has a solid-steel layer of thickness E that meets the economical and technical constraints, the reservoir according to the invention comprises several mixed layers of prestressed concrete. According to an alternative that could be combined with the previous embodiment, the reservoir according to the invention comprises a winding steel wires having the diameter and mutual spacing in the longitudinal direction (winding pitch) allowing the required prestress to be achieved.

It is quite obvious that, according to this embodiment, the thicknesses of the concrete sublayer and of the concrete internal layer are also engineered to withstand the compression exerted by the prestressing wires. A designer is perfectly aware of how to engineer this, for example using Abaqus (Dassault Systems, France) software.

FIGS. 1a and 1b depict views in cross section of a nonlimiting example of a pressurized-fluid storage reservoir according to the invention that complies with the characteristics described hereinabove. Thus, this exemplary embodiment of the invention is formed of 4 concentric layers C1, C2, C3, and C4, the layer C2 corresponding to the steel layer, this one being flanked by an internal layer of concrete C1, surmounted by a mixed layer C3 formed of a sublayer C3' made of concrete and of steel wires C3" wound around this concrete sublayer C3', the steel wires being surmounted by a protective external layer C4. Thus, this exemplary embodiment comprises a single mixed layer of prestressed concrete.

According to one embodiment of the invention, the pressurized-fluid storage reservoir comprises a plurality of mixed layers of prestressed concrete, the outermost of these mixed layers being, according to the invention, followed by an external layer affording protection against at least one of physical and chemical damage. This plurality of mixed layers of prestressed concrete makes it possible to reduce the thickness of the steel layer while at the same time ensuring the mechanical strength allowing the assembly to withstand the service pressure. The number of mixed layers of prestressed concrete may be determined by engineering based on geometric and mechanical data (diameter of the steel wires, winding pitch, applied prestress, thickness of the concrete sublayer, etc.). A designer is perfectly aware of how to engineer this, for example using Abaqus (Dassault Systems, France) software.

One nonlimiting example of how to embody a reservoir according to the invention comprising two mixed layers of prestressed concrete C3 is depicted in FIGS. 2a and 2b. These figures show that the winding of steel wires C3" furthest toward the inside of the reservoir is incorporated between two concrete sublayers C3', the winding C3" of steel wires furthest toward the outside of the reservoir being followed by an external layer C4 affording protection against at least one of physical and chemical damage.

According to an alternative form of embodiment of the invention, in which the pressurized-fluid storage reservoir comprises mixed layers of prestressed concrete, each of the layers having its own prestress. Advantageously, the prestress applied to a given layer is determined according to the radial distance of this layer.

According to one implementation of the invention, the reservoir according to the invention is formed from tubes, the plurality of tubes notably potentially being necessary when the volumes of pressurized fluid to be stored are great and a single tube is insufficient for storing such a volume. The tubes that make up the reservoir according to the invention may or may not be coupled to one another by a coupling. The coupling may for example be a weld, an elastomer seal, it being possible for the latter to be sliding, slipping, rolling, etc.

The invention also relates to a method for manufacturing a reservoir for storing a pressurized fluid. The manufacturing method according to the invention requires the availability of at least one steel tube of thickness E and a reel of steel wire. The method according to the invention includes at least the following steps:

a) forming a concrete layer on the inside of the steel tube;
b) forming a concrete sublayer on the outside of the steel tube; and
c) winding the steel wires from the reel helicoidally, while subjecting them to circumferential tensile prestress;
d) providing an external layer for protecting the steel wires against at least one physical and chemical.

Furthermore, according to the invention, the method may comprise a preliminary step of engineering at least one of the thickness E and the prestress according at least to the service pressure. According to one embodiment of the invention, the service pressure is at least equal to 100 bar, preferably 125 bar.

According to one alternative form of embodiment of the invention, steps b) and c) of the method according to the invention, described hereinabove are repeated provide a plurality of layers by winding of steel wires on a concrete sublayer, also referred to as mixed layers of prestressed concrete. This alternative form of the method is needed when just one mixed layer of prestressed concrete is unable to provide the level of prestress determined to be required by engineering. That makes it possible to contribute to the manufacturing of a reservoir according to the invention in which the steel layer has a thickness E that is realistic, both economically and technically, while at the same time ensuring the mechanical integrity of the reservoir overall. The number of mixed layers of steel/prestressed concrete can be predetermined by engineering, for example using the Abaqus (Dassault Systèmes, France) software.

According to one embodiment of the invention, at least the internal layer of concrete, and the concrete sublayer(s) of the mixed layer(s) of prestressed concrete are formed by centrifugal spinning or indeed by vibration molding.

The invention also relates to a system for storing and recovering energy by use of compressed gas comprising at least one means for compressing the gas, at least one reservoir for storing a pressurized fluid as described hereinabove, at least one means for storing heat, and at least one means for expanding the compressed gas to generate energy.

Thus, the reservoir for storing a pressurized fluid in the system for storing and recovering energy by use of compressed gas according to the invention comprises at least one tube formed in an arrangement of ordered concentric layers, working from the inside toward the outside of the tube, as:

an internal layer made of concrete;
a layer made of steel of thickness E;
at least one layer formed by winding of steel wires on a concrete sublayer, the steel wires being subjected to a circumferential tensile prestress; and
an external layer which protects the steel wires against at least one physical and chemical damage.

In addition, at least the circumferential tensile prestress applied to the steel wires, or alternatively at least the thickness E of the layer made of steel, or alternatively at least both the circumferential tensile prestress applied to the steel wires and the thickness E of the layer made of steel are predetermined according at least to the service pressure. According to one embodiment of the invention, the service pressure is at least equal to 100 bar, preferably 125 bar.

Thus, the system for storing and recovering energy by use of compressed gas comprises a reservoir for storing a fluid under pressure that makes possible, in comparison with an all-steel reservoir, reduction of the amount of steel required and the technical constraints to be satisfied. The system for storing and recovering energy by use of compressed gas according to the invention is thus economically and technically viable.

For preference, the compressed gas of the system for the storage and recovery of energy by use of compressed gas, is air. The means for compressing the gas (or compressor) may be driven by a motor, notably an electrical motor. The means for expanding the gas (also referred to as an expansion device or turbine) allows the compressed and stored gas to be expanded, thereby generating energy, notably electrical energy, by use of a generator. The means for storing heat, that allows the storage of heat from the compressed gas during the energy-storage phase, and that allows the stored heat to be restored to the compressed gas during the energy recovery phase, are preferably placed at the outlet of the compression means (compressor) and at the inlet of the expansion means (turbine). According to one embodiment of the invention, the heat storage comprises solid heat-storage particles. These solid particles exchange heat with the gas during the energy storage and recovery phases, with heat being stored in the particles between these two phases.

According to one embodiment of the invention, the system according to the invention comprises a plurality of compressors (or expansion) means turbines mounted in succession one after the other in series (they are then referred to as staged compression means or compressors). The compressed (or expanded) gas leaving the first compression (or expansion) means then passes into a second compression (or expansion) means respectively, and so on.

According to one alternative form of embodiment of the invention, the staged or non-staged compression means may be reversible, which means to say may operate both for providing compression and for providing expansion of the gas. Thus it is possible to limit the number of devices used in the system according to the invention, thereby allowing savings in terms of the weight and volume of the system according to the invention.

The pressurized-fluid storage reservoir employed in the system for storing and recovering energy by use of compressed gas according to the invention may be situated on the surface or in the ground. In addition, it may, as described hereinabove, be made up of a single volume, in the form of a tube formed of concentric layers, or else of a plurality of such tubes which may or may not be coupled together.

The system according to the invention is suited to any type of gas, notably to air. In this case, the input air used for compression may be taken in from the ambient air, and the output air after expansion can be released back into the ambient air.

The means for storing heat make it possible, when storing the compressed gas (during compression), to recover a maximum proportion of heat resulting from the compression of the gas at the outlet of the compressors, and to reduce the temperature of the gas before moving on to the next compression or before storing the compressed gas. For example, the compressed gas may pass from a temperature in excess of 150° C. (for example around 190° C.) to a temperature of below 80° C. (for example around 50° C.). The heat storage makes it possible, when recovering energy, to recover a maximum proportion of stored heat by increasing the temperature of the gas before moving on to the next expansion. For example, the gas may pass from a temperature of below 80° C. (for example of around 50° C.) to a temperature in excess of 150° C. (for example around 180° C.).

FIG. 3 illustrates one nonlimiting example of a system for storing and recovering energy by use of a compressed gas according to the invention, comprising a gas compression means (compressor) 1, a heat storage means (heat storage) 2, a pressurized-fluid storage reservoir 3 according to the invention and a gas-expansion means (turbine) 4. In this figure, arrows drawn in continuous line illustrate the circulation of the gas during the compression (energy storage) steps, and arrows drawn in dotted line illustrate the circulation of the gas during the expansion (energy recovery) steps. The heat storage system 2 is inserted between the compression/expansion means 1 or 4 and the reservoir 3 according to the invention. Conventionally, during an energy storage (compression) phase, the air is first of all compressed in the compressor 1 then cooled in the heat-storage system 2. The compressed and cooled gas is stored in the reservoir 3 according to the invention. The heat storage system 2 stores the heat during the cooling of the gas compressed in the compression phase. During energy recovery (expansion), the compressed gas stored in the reservoir 3 according to the invention is warmed up in the heat storage system 2. Next, in the conventional way, the gas passes through an expansion means 4.

The system for storing and recovering energy by use of compressed gas according to the invention is not restricted to the example of FIG. 3. Other configurations may be envisioned: several compression and/or expansion stages, the use of reversible means to perform compression and expansion, etc.

The present invention also relates to a storage and recovery method using compressed gas, in which method the following steps are performed:
a) compressing a gas, notably by use of a compressor;
b) cooling the compressed gas by exchange of heat, particularly in a heat storage means;
c) storing the cooled compressed gas, notably in a reservoir for the storage of a pressurized fluid according to the invention;
d) warming the stored compressed gas by exchange of heat in the heat storage means; and
e) expanding the warmed compressed gas to generate energy, for example by use of a turbine to generate electrical energy.

Thus, the reservoir for storing a pressurized fluid in the storage and recovery method using compressed gas according to the invention comprises at least one tube formed of an arrangement of concentric layers, the concentric layers being ordered, working from the inside toward the outside of the tube, as follows:
an internal layer made of concrete;
a layer made of steel of thickness E;
forming at least one layer formed by a winding of steel wires on a concrete sublayer, the steel wires being subjected to a circumferential tensile prestress; and
providing an external layer to protect the steel wires against at least one of physical and chemical damage.

In addition, at least the circumferential tensile prestress applied to the steel wires, or alternatively the thickness E of the layer made of steel, or alternatively both the circumferential tensile prestress applied to the steel wires and the thickness E of the layer made of steel are predetermined according at least to the service pressure. According to one embodiment of the invention, the service pressure is at least equal to 100 bar, preferably 125 bar. Thus, the storage and recovery method using compressed gas according to the invention is implemented using a reservoir for storing a fluid under pressure that makes it possible, in comparison with an all-steel reservoir, to reduce the amount of steel needed and the technical constraints to be satisfied. The storage and recovery method using compressed gas according to the invention is thus economically and technically viable.

According to one aspect of the invention, the storage and recovery method using compressed gas comprises several successive compression steps, using compressors placed in series, also referred to as staged compressions or compressors. In that case, steps a) and b) are repeated for each compression stage. Thus, the gas is compressed and cooled several times.

According to one feature of the invention, the compressed gas storage and recovery method comprises successive expansion steps, using expansion means (turbines) placed in series, also referred to as staged expansions. In that case, steps d) and e) are repeated for each expansion stage. Thus, the gas is heated and expanded several times.

Step a) relates to the compression of a gas, for example air. This may notably be air taken from the ambient environment.

Step b) allows the compressed gas to be cooled after each compression step, thereby making it possible to optimize the efficiency of the next compression and/or the storage of energy. The means for storing heat make it possible, when storing the compressed gas (during compression), to recover a maximum proportion of heat resulting from the compression of the gas at the outlet of the compressors, and to reduce the temperature of the gas before moving on to the next compression or before storage. For example, the compressed gas may pass from a temperature in excess of 150° C., for example around 190° C., to a temperature of below 80° C., for example around 50° C.

Step c) is performed by use of a reservoir according to the invention as described hereinabove, which may be situated on the surface or in the ground. In addition, it may be made up of a single volume or of a plurality of volumes which may or may not be interconnected. During storage, the reservoir according to the invention is closed.

The compressed gas is stored until such time as there is a desire to recover the stored energy. Step d) et seq are performed at the moment at which the stored energy is to be recovered.

Step d) allows the compressed air to be warmed before each expansion, thereby making it possible to optimize the efficiency of the next expansion. For step d), it is possible to use the heat storage particles used for cooling during step b). The heat storage means make it possible, when recovering energy, to recover a maximum proportion of stored heat by increasing the temperature of the gas before moving on to the next expansion. For example, the gas may pass from a temperature of below 80° C., for example of around 50° C., to a temperature in excess of 150° C., for example around 180° C.

During step e), the compressed gas is expanded. Expanding the compressed gas makes it possible to generate energy. This expansion may be performed by use of a turbine which generates electrical energy. If the gas is air, the expanded air can be discharged into the ambient surroundings.

The storage and recovery method using compressed gas and the storage and recovery system using compressed gas according to the invention can both be used for storing intermittent energy, such as wind or solar energy, so that this energy can be used when desired.

Exemplary Embodiment

The features and advantages of the method according to the invention will become more clearly apparent from studying the following application example.

In this example, a gas storage reservoir is engineered that meets the following technical requirements:
storage volume: 5700 m3
maximum service pressure: 125 bar
grade of steel: X80 (elastic limit=550 MPa, breaking stress=625 MPa)
maximum permissible stress set for $$\text{steel} = \text{Min}\left\{\frac{550}{1.5}, \frac{625}{2.4}\right\} = 260 \text{ MPa}$$

A first reservoir R1 corresponding to one embodiment of the reservoir according to the invention is engineered according to the technical requirements defined hereinabove, using the Abaqus (Dassault Systèmes, France) software. The main characteristics of the reservoir R1 are given below:
thickness of the steel layer: 8 mm
outside diameter of the steel layer: 1422.4 mm
inside/outside diameters of the mixed layer of concrete—steel=1300 mm/1800 mm
diameter of the prestressing wires 10 mm
winding pitch for the steel wires: 20 mm
applied prestress: 1300 MPa
overall length of reservoir: 4294 m
mass of steel tube: 1198 (metric) tonnes
mass of steel wires: 707 (metric) tonnes
mass of concrete layers: 12180 (metric) tonnes The circumferential stresses in the first four layers of the reservoir R1 (the layers being referenced as in FIG. 1a) are collated in table 1, for the case in which no pressurized fluid is being stored (the case referred to as "not in service"; column 2 of table 1) and for the case in which fluid is being stored at a pressure of 125 bar in the reservoir (the case referred to as "in service"; column 3 of table 1). According to this table, it may be seen that the circumferential stresses in the steel layer C2 are, in service, below the maximum stress permissible for this same layer. Furthermore, the compressive prestress, when not in service, in this layer is far from the authorized limit.

The compressive prestress generated in the concrete layers C1 and C3' is 19 MPa and 16 MPa respectively. Thus, it may be seen that a grade of concrete that has a compressive strength of 35 MPa is sufficient.

Because of the instantaneous elastic deformation of the assembly, the tensile prestress in the steel wires when not in service is lower than the initial prestress applied. The value of the stress in service is within the authorized limit for the prestressing wires.

Thus, the present invention, by adding steel wires wound under clearly determined circumferential tensile prestress, makes it possible to create reservoirs for storing a pressurized fluid that have realistic thicknesses (8 mm in this instance) of steel, while at the same time meeting safety requirements.

TABLE 1

| Layer | Stresses not in service (MPa) | Stresses in service (MPa) |
|---|---|---|
| C2 | −102 | 249 |
| C3" | 1223 | 1450 |
| C1 | −19 | 2.3 |
| C3' | −16 | 2.5 |

By way of illustration, a second reservoir R2, is designed, which is identical to the reservoir R1, with the exception of the thickness of the steel layer which, in the case of R2, is of thickness E equal to 2 mm. The circumferential stresses in the first four layers of the reservoir R2 are set out in table 2, for the case in which no pressurized fluid is being stored (the case referred to as "not in service"; column 2 of table 2) and for the case in which fluid is being stored at a pressure of 125 bar in the reservoir (the case referred to as "in service"; column 3 of table 2).

TABLE 2

| Layer | Stresses not in service (MPa) | Stresses in service (MPa) |
|---|---|---|
| C2 | −113 | 606 |
| C3" | 1215 | 1656 |
| C1 | −21 | 2.3 |
| C3' | −18 | 2.5 |

It may be seen that, in the absence of stresses associated with the pressure of the stored gas (column 2 of table 2), the reduction in the thickness of steel (in comparison with R1) does not significantly change the stresses. This is due to the fact that, in this case, the concrete (of layers C1 and C3') plays a very important role in compression. By contrast, in the in-service phase (column 3 of table 2) it can be seen that the stresses in the steel (layer C2) and in the prestressing wires (layer C3") are far higher. These stresses are inadmissible and the system is unable correctly to withstand the internal pressure.

Likewise for illustration, a reservoir R3 is engineered, this time made up of a single layer of steel. By setting an outside diameter of 56" (1422.4 mm) for the steel tube, which is a conventional size for an oil pipeline of type X80 in particular, the following characteristics are obtained from conventional calculation in accordance with the CODAP standard, on the basis of the strength-of-materials (RDM) equations:
thickness of steel: 33.5 mm
total length of tubes: 3950 m
total mass of steel: 4533 (metric) tonnes It is found, by comparing the characteristics of reservoir R1 with those of reservoir R3, that the total mass of steel is far greater for the all-steel reservoir R3 than for the reservoir R1 according to the invention. In the knowledge that the price of a metric ton of concrete is far lower than that of steel (for example of the order of 1/20 of same), the reservoir for the storage of a pressurized fluid according to the invention, by adding layers of concrete to a layer of steel, and by adding prestress applied during the winding of steel wires, is more economical, while at the same time guaranteeing fluidtightness and mechanical strength to withstand the envisioned service pressures.

The invention claimed is:

1. A reservoir for storing a pressurized fluid including at least one tube formed as concentric layers, the concentric layers consisting of from the inside toward outside of the tube, an internal layer formed from concrete, a layer formed from steel, at least one layer of wound steel wires disposed on a continuous sublayer formed from concrete, and an external layer protecting the steel wires against at least one of physical and chemical damage, and wherein the wires are circumferentially prestressed, and wherein thickness of the layer formed of steel and the at least one layer of steel wires wound on a sublayer withstand pressure of the pressurized fluid in excess of 100 bar.

2. The reservoir as claimed in claim 1, wherein a diameter and spacing of the steel wires in an axial direction of the tube is dependent on the circumferential prestress.

3. The reservoir as claimed in claim 1, wherein the at least one tube comprises steel wires wound in layers on the concrete sublayer, wherein the windings have a prestress determined by a radial distance of the at least one layer from a center axis of the at least one tube.

4. The reservoir as claimed in claim 3, wherein the at least one tube comprises steel wires wound in layers on the concrete sublayer, wherein the windings have a prestress determined by a radial distance of the at least one layer from a center axis of the at least one tube.

5. The reservoir as claimed in claim 1, wherein the external layer comprises concrete or mortar.

6. The reservoir as claimed in claim 2, wherein the external layer comprises concrete or mortar.

7. The reservoir as claimed in claim 3, wherein the external layer comprises concrete or mortar.

8. The reservoir as claimed in claim 4, wherein the external layer comprises concrete or mortar.

9. The reservoir as claimed in claim 1, wherein the steel layer is a steel tube of API grade X80.

10. The reservoir as claimed in claim 1, wherein the reservoir is formed of tubes which are not coupled together.

11. The reservoir as claimed in claim 1, wherein the reservoir is formed of tubes which are coupled together by welding or using an elastomer seal.

12. A method for manufacturing a reservoir for storing a pressurized fluid as recited in claim 1, wherein, starting with a solid-steel tube of thickness and a reel of steel wire, at least the following steps are performed:
    a) forming an internal concrete layer inside of the steel tube;
    b) forming a concrete sublayer outside of the steel tube;
    c) winding the steel wires from the reel helically on the concrete sublayer while, subjecting the wires to circumferential tensile prestress; and
    d) providing an external layer protecting the steel wires against physical and chemical damage and
at least one of the thickness and the prestress is dependent on pressure of the stored pressurized fluid.

13. The method as claimed in claim 12, wherein steps b) and c) are repeated to form layers formed by winding the steel wires on the concrete sublayer.

14. The method as claimed in claim 12, wherein at least the internal concrete layer and the concrete sublayer are formed by one of centrifugal spinning or vibration molding.

15. The method as claimed in claim 13, wherein at least the internal concrete layer and the concrete sublayer are formed by one of centrifugal spinning or vibration molding.

16. A system for storing and recovering energy by use of compressed gas comprising at least one means for compressing the gas, at least one reservoir for storing a pressurized fluid as recited in claim 1, at least one means for expanding the compressed gas to generate energy, and at least one means for storing heat.

17. A method for storing and recovering energy using compressed gas, comprising:
    a) compressing a gas;
    b) cooling the compressed gas by exchanging heat with a heat storage;
    c) storing the cooled compressed gas in a reservoir for storing a pressurized fluid as recited in claim 1;
    d) warming the cooled compressed gas by restitution of the heat stored in the heat storage; and e) expanding the warmed compressed gas to generate energy.

* * * * *